United States Patent [19]

Yano et al.

[11] 4,307,442
[45] Dec. 22, 1981

[54] TRANSMISSION LINE INTERCONNECTING SYSTEM

[75] Inventors: Masao Yano, Takarazuka, Japan; Susumu Matsumura, No. 6, Yoshida-Adachi-cho, Sakyo-ku, Kyoto-shi, Japan

[73] Assignees: Mitsubishi Denki Kabushiki Kaisha, Tokyo; Susumu Matsumura, Kyoto, both of Japan

[21] Appl. No.: 83,782

[22] Filed: Oct. 11, 1979

[30] Foreign Application Priority Data

Oct. 11, 1978 [JP] Japan .................. 53-124816

[51] Int. Cl.³ ........................... H02H 7/12; H02J 3/36
[52] U.S. Cl. ................................... 363/51; 363/35; 363/37; 323/207
[58] Field of Search ............... 363/35, 37, 51, 85, 363/87, 96; 323/101, 102, 119, 205, 207

[56] References Cited

U.S. PATENT DOCUMENTS

| | | | |
|---|---|---|---|
| 3,801,895 | 4/1974 | Kanngiesser | 363/51 X |
| 3,949,291 | 4/1976 | Kanngiesser et al. | 363/35 X |
| 4,151,585 | 4/1979 | Bowles | 363/35 |
| 4,173,780 | 11/1979 | Häusler et al. | 363/35 X |

OTHER PUBLICATIONS

"Economic Supply of a Reactive Power for H.V.D.C. Invertor Stations", by F. Buseman, Direct Current, Jun. 1954, pp. 8–15.

"Die Zwangskommutierung, Ein Neurer Zweig der Stromrichter-Technik" by Von Ludwig Abraham and Floris Koppelmann, ETZ, Hett 18, Bd. 87, Sep. 2, 1966, pp. 649–658.

Primary Examiner—William M. Shoop
Assistant Examiner—Peter S. Wong
Attorney, Agent, or Firm—Oblon, Fisher, Spivak, McClelland & Maier

[57] ABSTRACT

A transmission line interconnecting system including an AC-DC converter connected to a first transmission line; and a forced-commutated type inverter connected to a second transmission line. DC terminals of the AC-DC converters and the forced commutated type inverter are connected and the output voltage of the forced commutated type inverter is varied by controlling DC voltage to feed a reactive power to the second transmission line in a normal state and to feed an active power from the first transmission line through the AC-DC converter and the forced excitation inverter to the second transmission line in an emergency state.

1 Claim, 8 Drawing Figures

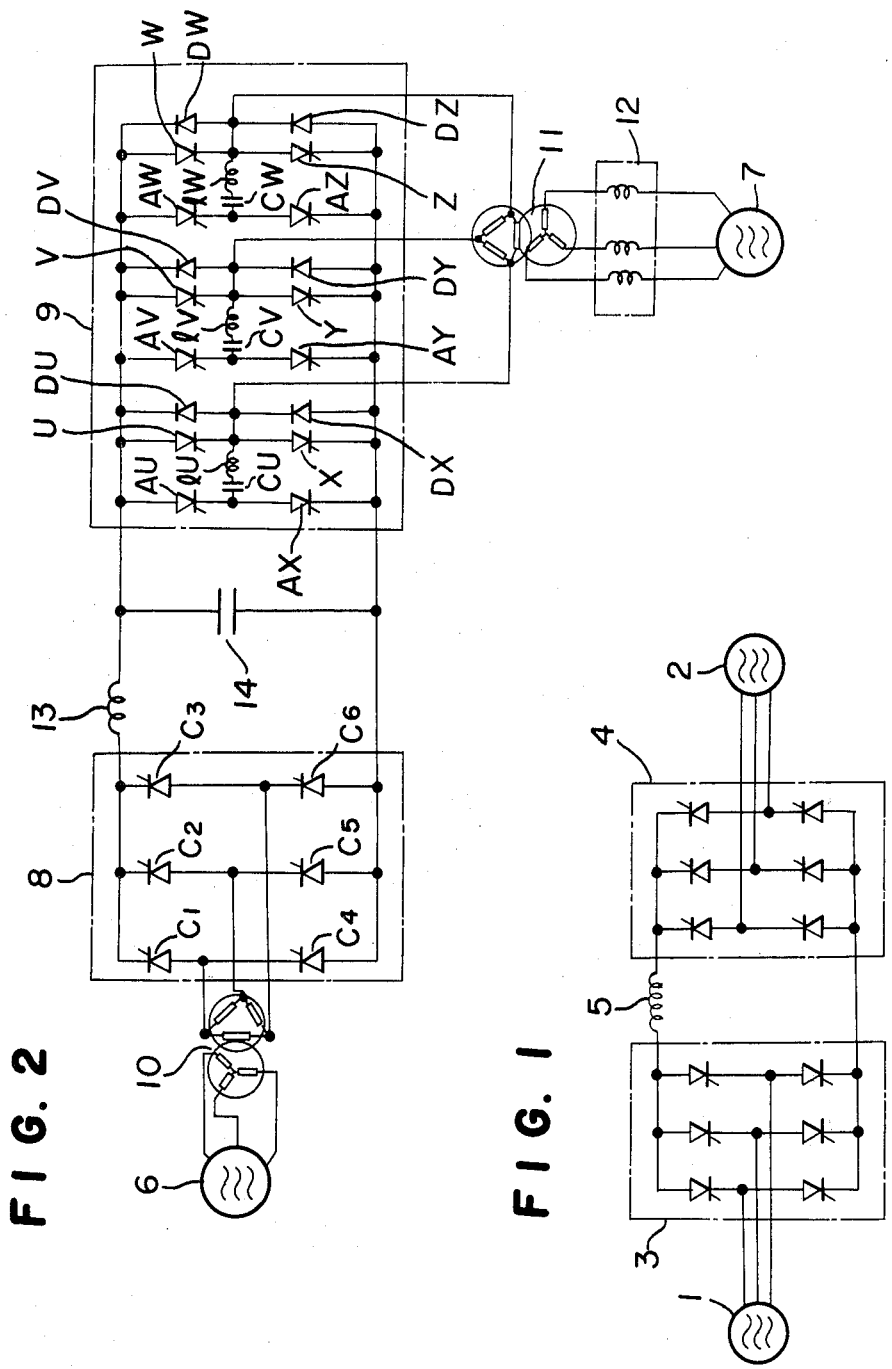

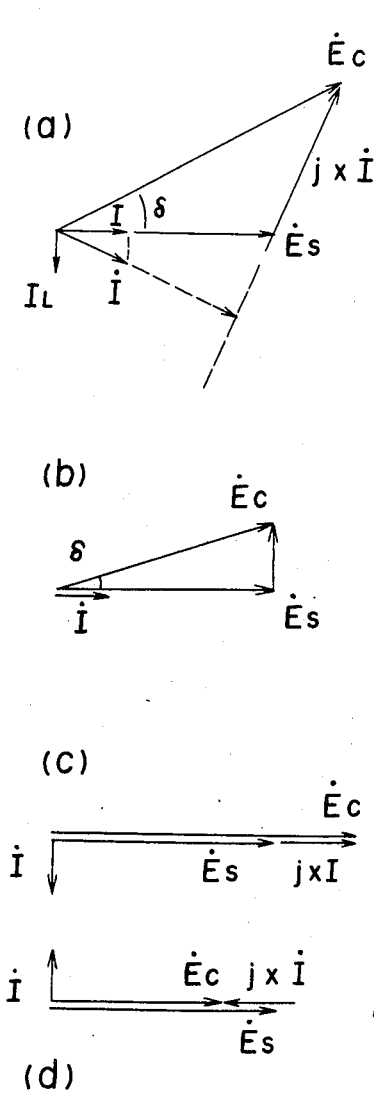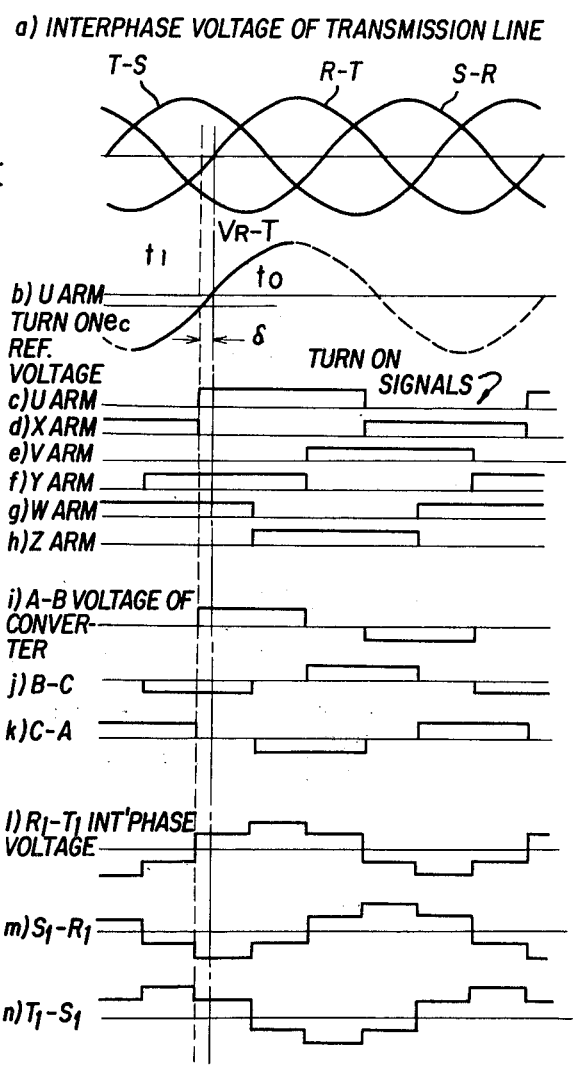

TRANSMISSION LINE INTERCONNECTING SYSTEM

BACKGROUND OF THE INVENTION

1. Field of the Invention

The present invention relates to a transmission line interconnecting system which interconnects two transmission power lines so as to accommodate an active power between the two transmission lines during emergency period.

2. Description of the Prior Arts

In the conventional system controlling system, two pairs of line commutated type converters are connected in series in the DC side and the control between the converters has been carried out by controlling turn-on angles of thyristors. However, the power-factor of the converters has not been high and accordingly, about 60% of reactive power based on the converted active power should be fed during the power accommodation period. Moreover, when the power accommodation is not needed, this has not any effect to the power transmission line to be immaterial.

FIG. 1 is a connection diagram showing the principle of the conventional transmission line system. In FIG. 1, the reference numerals (1) and (2) designate respectively the first and second transmission lines; (3) and (4) designate respectively converters having thyristor circuits; (5) designates a smoothing inductor for controlling ripple current produced by the difference in voltage waveforms formed between the converters (3), (4). In the conventional transmission line system, the smoothing inductor (5) connected at the DC side of the converters (3), (4) carries out smoothing the DC current to form the AC current having rectangular waveform. A current source inverter is formed by these parts. In the system, the active power from the transmission line is given as KEIa cos α and the reactive power from the transmission line is given as KEIa sin α wherein E designates a voltage in the transmission line; Ia designates AC current; and α designates a turn-on angle of the thyristor and K is a constant. These powers are respectively fed into the converters.

A ratio of the reactive power to the active power is given as sin 30°/cos 30°=0.58 when α is 30°. Thus, in the conventional transmission line, the reactive power is consumed from the system. Therefore it is necessary to have a phase adjusting device having large capacity, disadvantageously.

SUMMARY OF THE INVENTION

It is an object of the present invention to overcome said disadvantages and to provide a transmission line interconnecting system which has high power-factor of the active power during the accommodation period and can be used as a phase adjusting device capable of feeding of the reactive power during non-accommodation period. The system is formed by connecting two transmission lines through the AC-DC converters and the forced commutated type inverter so as to feed the reactive power from the first transmission line to the second transmission line in the normal state and to feed the active power from the first transmission line to the second transmission line in the emergency state.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a connection diagram showing a principle of the conventional transmission line interconnecting system;

FIG. 2 is a connection diagram showing the main circuit of the system of the present invention;

FIG. 4 is a diagram illustrating waveforms for describing operations of the forced commutated type inverter;

FIG. 5(a) is a vector diagram showing the relation of the forced commutated type inverter in the conventional system; and FIGS. 5(b), (c) and (d) are vector diagrams showing relations of the forced commutated type inverter in the system of the present invention.

DETAILED DESCRIPTION OF THE PREFERRED EMBODIMENTS

Figure 3:
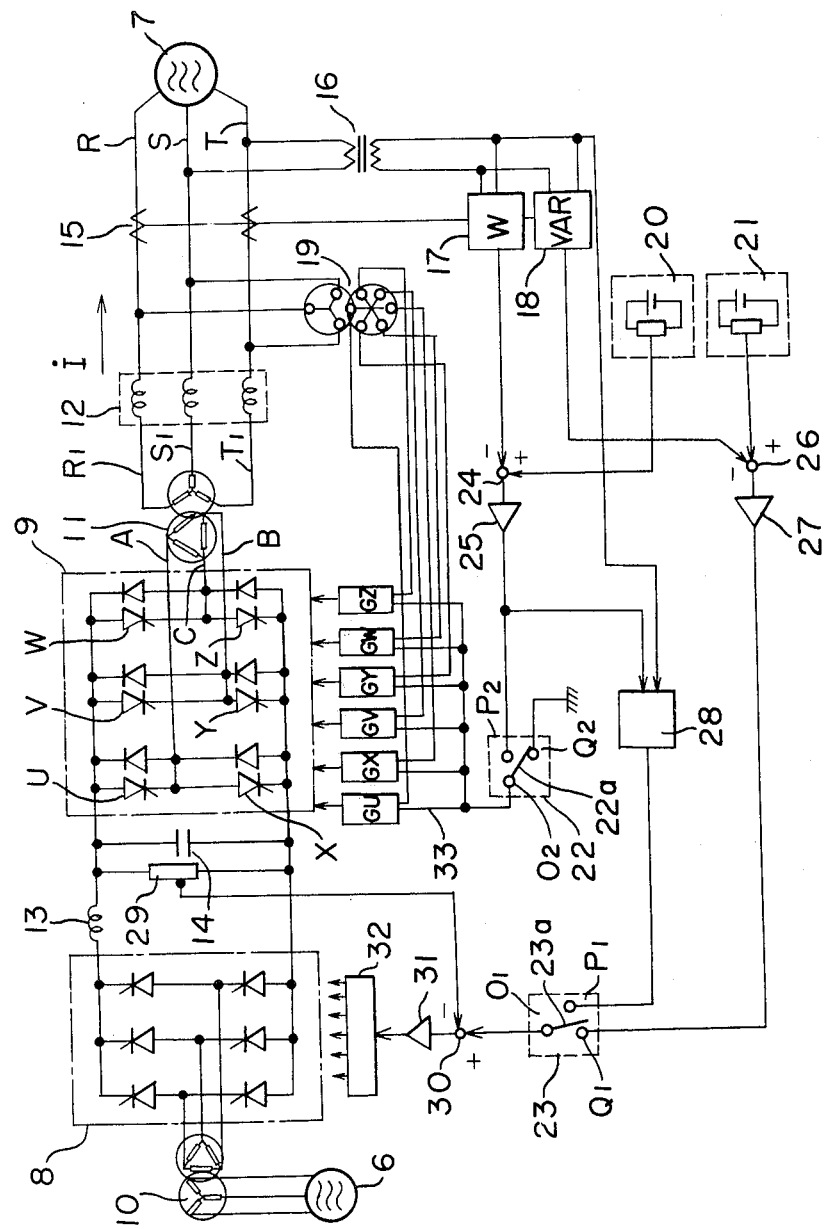
FIG. 3 is a connection diagram of the system for describing related operations of devices in the system of the present invention.

Referring to the drawings, the system of the present invention will be illustrated.

In FIG. 2, the reference numerals (6) and (7) designate respectively the first and second transmission lines; (8) designates an AC-DC converter; (9) designates a forced commutated type inverter; (10) and (11) designate respectively transformers; (12) designates an AC inductor which can be substituted by leakage reactance of the transformer (11); (13) designates a current smoothing inductor; (14) designates a voltage smoothing capacitor.

In the AC-DC converter (8) surrounded by the chain line, the references (C1), (C2), (C3), (C4), (C5) and (C6) designate thyristors. In the forced commutated type inverter (9) surrounded by the chain line, the references (U), (V), (W), (X), (Y) and (Z) designate main thyristors; (AU), (AV), (AW), (AX), (AY) and (AZ) designate auxiliary thyristors for turning off the main thyristors; (DU), (DV), (DW), (DX), (DY) and (DZ) designate diodes for by-passing; (CU), (CV) and (CW) designate capacitors for commutation; and (lU), (lV) and (lW) designate inductors which are serially connected to the corresponding capacitors for commutation (CU), (CV) and (CW).

The forced commutated type inverter (9) can be formed by the Mc Murray type impulse commutation circuit. The charges charged in the capacitors for forcible commutation are discharged by turning on the auxiliary thyristors (AU), (AV) and (AW) whereby the reverse voltage is applied to the main thyristors (U), (V), (W), (X), (Y) and (Z) thereby causing them to turn off. It has been known to impart excellent characteristics as the forced commutated inverter by carrying out the forcible commutation without affecting the line impedance or frequency by the operation of the diodes (DU), (DV), (DW), (DX), (DY) and (DZ) connected in parallel to the corresponding main thyristors (U), (V), (W), (X), (Y) and (Z).

The inverter circuit is not limited to the circuit shown in FIG. 2, and the object of the present invention has been attained by using the other commutation type forced commutated type inverter circuit.

Referring to FIG. 3, the operations between the parts used in the system of the present invention will be illustrated.

In the system of FIG. 3, the forced commutated inverter (9) comprises the auxiliary thyristors for turning off the main thyristors, the capacitors for commutation and the inductors as shown in FIG. 2. However, in order to simplify, only parts needed for the illustration are shown in FIG. 3. In FIG. 3, the similar references designate the identical or corresponding parts shown in FIG. 2.

In the FIG. 3, the references (R), (S) and (T) designate terminals of the second transmission line (7); (R1), (R2) and (R3) designate terminals of the transformer (11) at the transmission line side; (A), (B) and (C) designate terminals the transformer (11) at the forced commutated inverter (9) side; (15) designates a current transformer; (16) designates a potential transformer; (17) designates an active power measuring circuit; (18) designates a reactive power measuring circuit; (19) designates a control transformer for detecting phase of the voltage in the transmission line; (GU), (GV), (GW), (GX), (GY) and (GZ) designate firing circuits for the main thyristors (U), (V), (W), (X), (Y) and (Z) in the forced commutated inverter (9).

Although there is no description in FIG. 3, the auxiliary thyristor (AX) for the main thyristor (X) is simultaneously turned on with the turn-on of the main thyristor (U), whereby the main thyristor (X) is turned off. The auxiliary thyristor (AU) for the main thyristor (U) is simultaneously turned on with the turn-on of the main thyristor (X) whereby the main thyristor (U) is turned off. The reference numeral (20) designates a first reference signal circuit which generates an analog signal when the accommodation active power is set in the emergency state; (21) designates a second reference signal circuit which generates an analog signal when the reactive power is set in the normal state; (22) and (23) designate switches for switching the emergency mode—the normal mode to perform the switching of the mode of the active power conversion—the reactive power feeding. In the switches (22) and (23), the references 02 and 01 designate terminals respectively connecting always to the blades (22a), (23a); (P1) and (P2) designate terminals connecting in the active power conversion; (Q1) and (Q2) designate terminals connecting in the reactive power feeding. The reference numeral (24) designates a matched point for the reference value and the measured value of the active power; (25) designates an operation amplifier; (26) designates a matching point for the reference value and the measured value of the reactive power; (27) designates an operation amplifier; (28) designates a function circuit for calculating DC voltage depending upon the transmission line voltage in the active power accommodation and the phase difference between the phases of the transmission voltage and the output voltage of the forced commutated inverter (9); (29) designates a DC voltage detecting circuit; (30) designates a matching point for the reference value and the measured value of the DC voltage; (31) designates an operation amplifier; (32) designates a trigger circuit for turning on the thyristor for the AC-DC converter (8); (33) designates an input signal line for the firing circuits (GU), (GV), (GW), (GX), (GY) and (GZ) and the analog signal ec in the input signal line (33) will be illustrated below.

FIG. 4 is a diagram for illustrating the operation of the forced commutated inverter. FIG. 4(a) illustrates the interphase voltage of the second transmission line (7); and FIG. 4(b) illustrates the operation of the turn-on circuit (GU) of the U arm. The turn-on circuit (GU) comprises a comparator circuit and a pulse generator circuit wherein the voltage $V_{R-T}$ in the secondary side of the control transformer (19) and the signal voltage ec of the input line (33) from the control loop are compared. At the time $t_1$ for equal voltage, the turn-on signal is fed to the thyristor (U). The turn-on signal has a pulse width of 180° as shown in FIG. 4(c), and is fed at the time $t_1$ which leads for a phase angle $\delta$ from the time $t_0$ for zero of the R−T interphase voltage of the transmission line. The references (d), (e), (f), (g) and (h) designate turn-on signals of the thyristors (X), (V), (Y), (W) and (Z) and FIG. 4(i), (j) and (k) show voltage waveforms of the transformer (11) in the inverter side; FIG. 4(l), (m) and (n) show voltage waveforms of the transformer (11) in the transmission line side.

The $R_1 - T_1$ interphase voltage of the forced commutated inverter (9) shown in FIG. 4(l) leads for the phase angle $\delta$ from the R−T interphase voltage of the transmission line. The phase angle can be lead or lagged from the transmission line voltage depending upon the change of the reference signal voltage ec fed to the turn-on circuit (GU).

FIG. 5 shows the operation in the relation of the forced commutated type inverter and the transmission line.

In FIG. 5, the reference $\dot{E}s$ designates a vector of the voltage in the second transmission line; $\dot{E}c$ designates a vector of the voltage generated by the forced commutated type inverter (9); X designates the reactance of the AC inductor (12); $\dot{I}$ designates the current vector of the current fed to the second transmission line (7); and the phase angle $\delta$ is the lead angle from $\dot{E}s$ to $\dot{E}c$, and Es and Ec are voltage amplitudes of $\dot{E}s$ and $\dot{E}c$.

The current $\dot{I}$ fed to the transmission line is given by the equation:

$$\dot{I} = (\dot{E}s - \dot{E}c)/jX \qquad (1)$$

wherein $\dot{I}$ includes an effective current component $I_R$ and a reactive current component $I_L$.

They can be given by the equations:

$$I_R = \frac{Ec}{X} \sin\delta \qquad (2)$$

$$I_L = \frac{1}{X}(Es - Ec\cos\delta) \qquad (3)$$

The active power and the reactive power fed from the forced commutated inverter to the transmission line are designated as P and Q. The following equations are given.

$$P = \frac{Es\,Ec}{X} \sin\delta \qquad (4)$$

$$Q = \frac{Es}{X}(Es - Ec\cos\delta) \qquad (5)$$

FIG. 5(a) is a vector diagram showing the condition for feeding the active power and the reactive power from the forced commutated inverter (9) to the second transmission line (7).

The loss of the interconnecting system including the loss of the forced commutated inverter (9) is given as Po. It is necessary to feed the active power of Po+P from the first transmission line (6) to the AC-DC converter (8).

FIG. 5(b) illustrates the operation for accommodating only active power to the second transmission line (7).

In order to give Q=0, it is necessary to give the equation:

$$Es = Ec \cos \delta \quad (6)$$

The equation (4) is substituted to give the equation:

$$P = \frac{E^2_s}{X} \tan \delta \quad (7)$$

That is, only active power can be fed to the second transmission line (7) by controlling the system so as to give the equations:

$$\delta = \tan^{-1}\left(\frac{PX}{E^2_s}\right) \quad (8)$$

$$Ec = \frac{Es}{\cos\delta} \quad (9)$$

in the accommodation power P required for the second transmission line (7).

The inverter output voltage Ec is given by the expansion of the interphase voltage of the converter shown in FIGS. 4(l), (m), (n) as the equation:

$$Ec = K\frac{\sqrt{\delta}}{\pi} Ed \quad (10)$$

wherein Ed designates the DC voltage applied between the terminals of the capacitor (14); and K designate a turn ratio of the transformer (11).

The value δ given by the equation (8) is set by the control element (25) shown in FIG. 3. The signal of the operation amplifier (25) and the voltage signal detected by the converter (16) are fed to the function circuit (28) so as to calculate by the equation (9). The DC voltage is controlled to give the calculated value, whereby only the active power P can be fed to the second transmission line (7). In accordance with such control, the AC-DC converter (8) absorbs the active power Po+P including the loss Po of the interconnecting system from the first transmission line (6).

FIGS. 5(c) and (d) illustrate the operation of the interconnecting system as the phase adjusting system when the active power is not needed for the second transmission line (7).

The switch (22) is connected to the terminal Q₁ grounded. The voltage ec of the signal line (33) is zero and the vector Ėc of the voltage generated by the forced-commutated type inverter (9) has the same phase to the vector Ės of the voltage in the transmission line.

When Ec is higher than Es as shown in FIG. 5(c), the lag phase current is fed to the second transmission line (7) whereby the interconnecting system imparts a capacitive effect.

When Ec is smaller than Es as shown in FIG. 5(d), the lead phase current is fed to the second transmission system (7) whereby the interconnecting system imparts an inductive effect.

When δ=0 in the equation (5), the following equation is given.

$$Ec = Es - \frac{X}{Es} Q \quad (11)$$

In a practical system, the closed loop is formed by the control elements (26) and (27) shown in FIG. 3 and the DC voltage Ed is controlled by the AC-DC converter (8) and the reactive power Q is fed to the second transmission line (7). Thus, it is enough to feed only the power for the loss Po of the interconnecting system from the first transmission line (6) so as to maintain the DC voltage Ed. The active power corresponding to 2 to 3% of the required reaction power Q is fed by the AC-DC converter (8).

In accordance with the present invention, the first transmission line is connected through the AC-DC converter and the forced commutated type inverter to the second transmission line. In the normal state, the reactive power is fed from the first transmission line to the second transmission line whereas in the emergency state, the active power is fed from the first transmission line to the second transmission line whereby the power factor is high during the accommodation of the active power and the system is operated as the phase controlling system for feeding the reactive power during the period of non-accommodation of the power and the highly effective system can be given.

When excess current is passed, the excess current can be decreased interrupted by the gate block of the forced commutated type inverter after commutating the arm current by turning on the auxiliary thyristors in the forced commutated type inverter and the gate shift and the gate block of the AC-DC converter. The operation is the same as the DC transmission line interconnecting system using the line commutated type converter. The increase of the short-circuit capacity in the transmission line can be prevented.

What is claimed as new and desired to be secured by Letters Patent of the United States is:

1. A transmission line interconnecting system, comprising:
   an AC-DC converter having AC and DC terminals respectively connected to a first AC transmission line and DC terminals of a DC transmission line;
   a forced commutated type inverter having AC terminals connected to a second transmission line and DC terminals connected to the DC transmission line, wherein the DC terminals of the AC-DC converter and the DC terminals of the forced commutated type inverter are connected via the DC transmission line; and,
   output voltage varying means for controlling the DC output of said AC-DC converter so as to feed a reactive power to said second transmission line in a normal state wherein said forced commutated type inverter and said second transmission line act as a reactive power supply, and so as to feed an active power to said second transmission line from said first transmission line through said AC-DC converter and said forced commutated type converter is an emergency state occuring when conditions exist in said second transmission line such that it is not otherwise possible to maintain the frequency and voltage of the second transmission line with the active power from said first transmission line.

* * * * *